US009516413B1

(12) United States Patent
Iyengar et al.

(10) Patent No.: US 9,516,413 B1
(45) Date of Patent: Dec. 6, 2016

(54) LOCATION BASED STORAGE AND UPLOAD OF ACOUSTIC ENVIRONMENT RELATED INFORMATION

(71) Applicant: Apple Inc., Cupertino, CA (US)

(72) Inventors: Vasu Iyengar, Pleasanton, CA (US); Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,175

(22) Filed: Sep. 30, 2014

(51) Int. Cl.
*H04R 3/02* (2006.01)
*H04W 4/02* (2009.01)

(52) U.S. Cl.
CPC ........... *H04R 3/02* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 4,979,163 | A * | 12/1990 | Erving | H04B 3/20 370/288 |
| 2004/0013280 | A1 * | 1/2004 | Niederdrank | H04R 25/453 381/315 |
| 2007/0242834 | A1 * | 10/2007 | Coutinho | G10K 11/1788 381/71.8 |
| 2008/0166971 | A1 | 7/2008 | Yashiro et al. | |
| 2008/0298614 | A1 * | 12/2008 | Cronin | H04R 25/70 381/314 |
| 2010/0036792 | A1 * | 2/2010 | Sawada | G06T 7/208 706/52 |
| 2011/0087491 | A1 * | 4/2011 | Wittenstein | G10L 15/26 704/235 |
| 2011/0288869 | A1 * | 11/2011 | Menendez-Pidal | G10L 15/144 704/256.1 |
| 2011/0293123 | A1 * | 12/2011 | Neumeyer | H04R 25/50 381/314 |
| 2012/0253802 | A1 * | 10/2012 | Heck | G06F 17/30528 704/235 |
| 2013/0124081 | A1 | 5/2013 | Khosravy et al. | |
| 2014/0018097 | A1 | 1/2014 | Goldstein | |

* cited by examiner

*Primary Examiner* — Peter Vincent Agustin
(74) *Attorney, Agent, or Firm* — Blakely, Sokoloff, Taylor & Zafman LLP

(57) ABSTRACT

Systems and methods are described for storing and reusing previously generated/calculated acoustic environment data. By reusing acoustic environment data, the systems and methods described herein may avoid the increased overhead in generating/calculating acoustic environment data for a location when this data has already been generated and is likely accurate. In particular, the time and complexity involved in determining reverberation/echo levels, noise levels, and noise types may be avoided when this information is available in storage. This previously stored acoustic environment data may not be limited to data generated/calculated by the same audio device. Instead, in some embodiments an audio device may access a centralized repository to leverage acoustic environment data generated/calculated by other audio devices.

23 Claims, 6 Drawing Sheets

LOCATION BASED STORAGE AND UPLOAD OF ACOUSTIC ENVIRONMENT RELATED INFORMATION

FIELD

A system and method for storing/uploading acoustic scene/environment related information, including reverberation data, for use during subsequent audio processing operations is described. Other embodiments are also described.

BACKGROUND

Some details about an acoustic scene/environment may be useful for signal processing. For example, algorithms used for reverberation suppression or de-reverberation require some knowledge of the reverberation of the acoustic environment (i.e., the room). Several different techniques may be used for estimating reverberation or other characteristics of the acoustic environment. However, each of these techniques may be computationally, time, and otherwise resource intensive. Accordingly, in some situations audio signal processing may be impractical as the level of computation and/or the time necessary to determine accurate estimates for these characteristics/values may be prohibitively high/large.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An audio processing system is described herein. As shown, the audio processing system may include an acoustic environment server and a set of audio devices. The audio devices may be coupled to the acoustic environment server through a network such that each of the audio devices may 1) upload information/data to the acoustic environment server that was measured/calculated by the corresponding audio device and describes the acoustic environment at which the information/data was measured/calculated and/or 2) download acoustic environment data from the acoustic environment server that was previously measured/calculated by an audio device and corresponds to the current location of the downloading audio device. Accordingly, each audio device may leverage acoustic environment data that was previously measured/calculated by either the same device or a different device.

Although described in relation to audio devices transmitting and retrieving acoustic environment data from a remote source (e.g., the acoustic environment server), in other embodiments each audio device may locally store acoustic environment data for later use. Accordingly, in some embodiments the audio devices may operate independently to store and reuse acoustic environment data describing locations visited by the audio device.

By reusing acoustic environment data, the systems and methods described herein may avoid the increased overhead in generating/calculating acoustic environment data for the current location of the audio device when this data has already been generated and is likely accurate. In particular, the time and complexity involved in determining reverberation/echo levels, noise levels, and noise types may be avoided when this information is available in storage.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
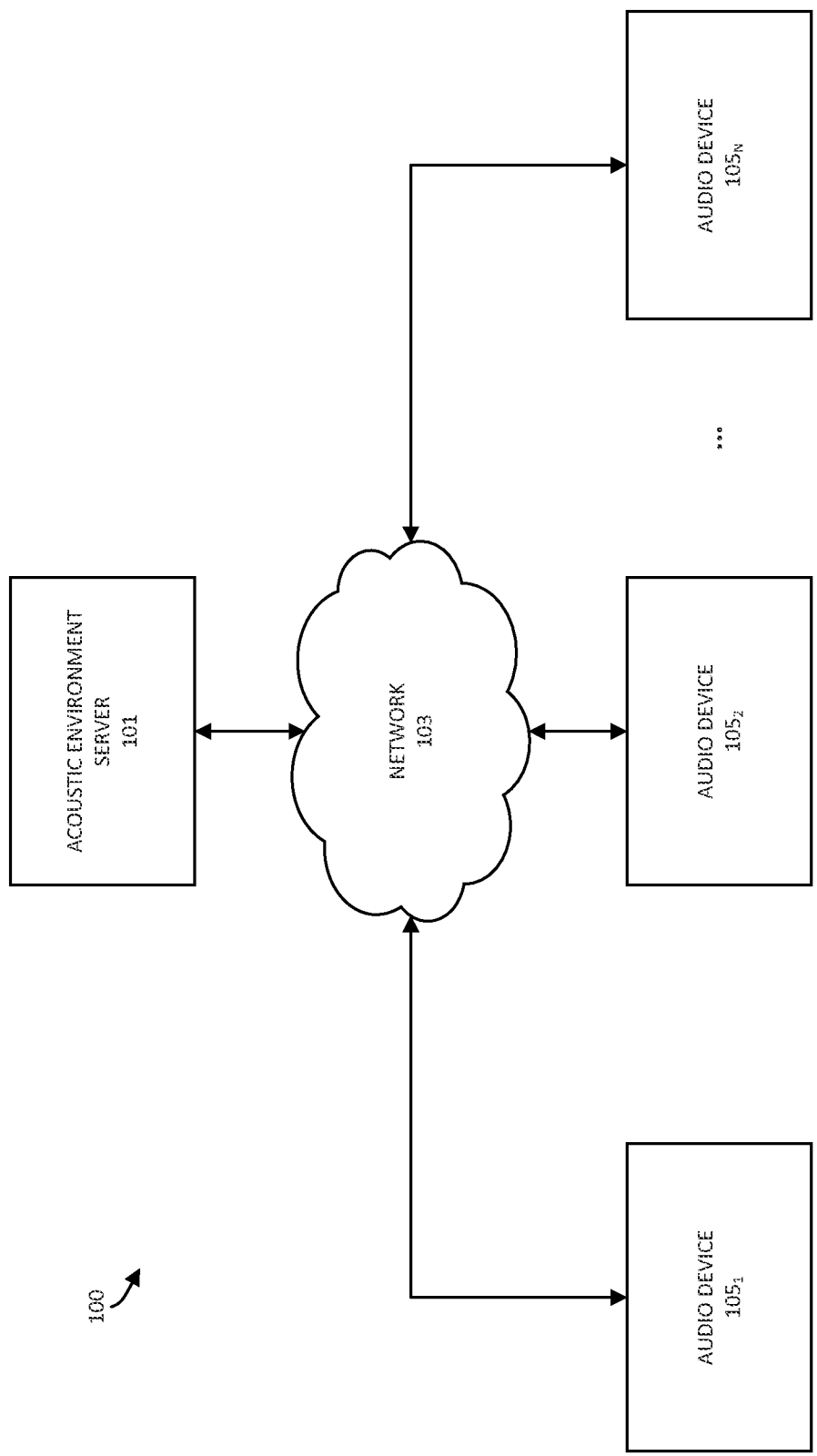
FIG. 1 shows a location based audio processing system according to one embodiment.

FIG. 1 shows a location based audio processing system 100 according to one embodiment. As shown, the audio processing system 100 may include an acoustic environment server 101 and a set of audio devices $105_1$-$105_N$, where N is greater than or equal to one. The audio devices $105_1$-$105_N$ may be coupled to the acoustic environment server 101 through a network 103 such that each of the audio devices $105_1$-$105_N$ may 1) upload information/data to the acoustic environment server 101 that was measured/calculated by the corresponding audio device $105_1$-$105_N$ and describes the acoustic environment at which the information/data was measured/calculated and/or 2) download acoustic environment data from the acoustic environment server 101 that was previously measured/calculated by an audio device $105_1$-$105_N$ and corresponds to the current location of the downloading audio device $105_1$-$105_N$. Accordingly, each audio device $105_1$-$105_N$ may leverage acoustic environment data that was previously measured/calculated by either the same device $105_1$-$105_N$ or a different device $105_1$-$105_N$. As will be described in greater detail below, this ability to share acoustic environment information may allow the audio devices $105_1$-$105_N$ to perform signal processing with decreased computational and time overhead.

Each element of the acoustic environment system 100 will now be described by way of example. Although described as including an acoustic environment server 101, a set of acoustic devices $105_1$-$105_N$, and a network 103, in other embodiments the acoustic environment system 100 may include more or less components than those shown and described. For example, although described as accessing acoustic environment data from the acoustic environment server 101, in some embodiments the acoustic environment data may be stored locally on the audio device $105_1$-$105_N$. In this embodiment, acoustic environment data may be stored and accessed without interaction with the acoustic environment server 101 and/or the network 103.

Figure 2:
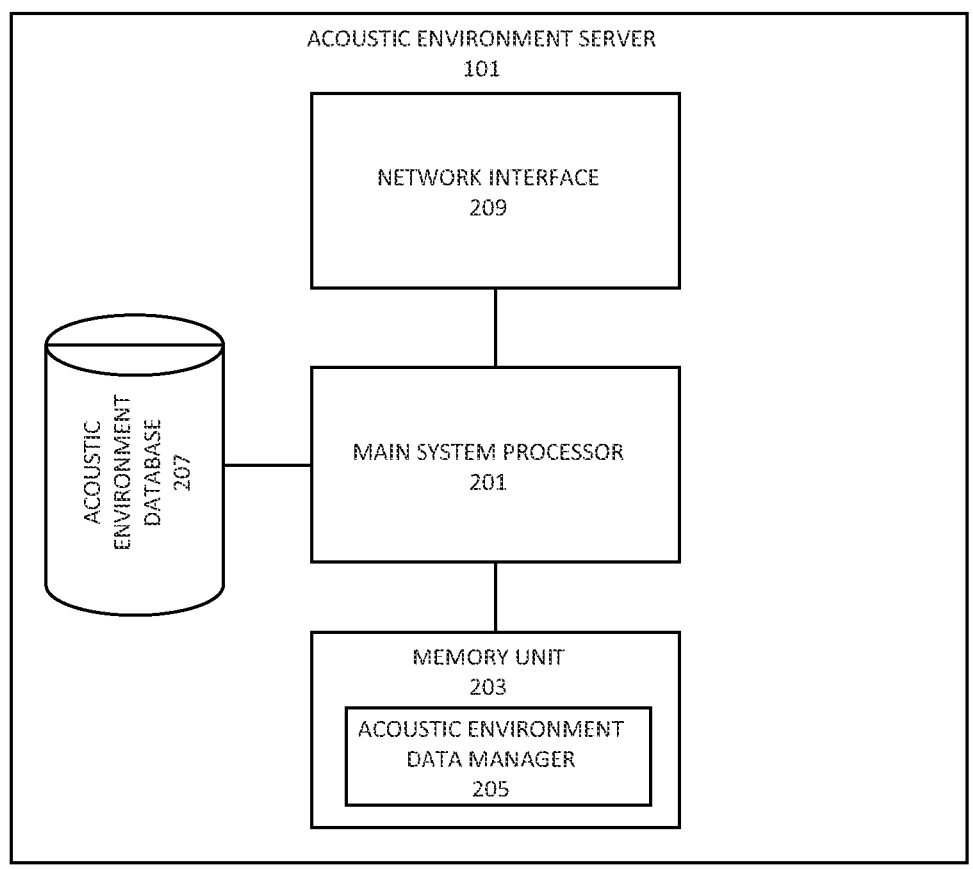
FIG. 2 shows a component diagram of an acoustic environment server according to one embodiment.

FIG. 2 shows a component diagram of the acoustic environment server 101 according to one embodiment. The acoustic environment server 101 may be any data storage and/or computing device that is configured to receive, store, and distribute acoustic environment data from/to the set of acoustic devices $105_1$-$105_N$. For example, the acoustic environment server 101 may be a desktop computer, a laptop computer, a tablet computer, a storage server, or any other similar storage and/or computing device.

As shown in FIG. 2, the acoustic environment server 101 may include a main system processor 201 and a memory unit 203. The processor 201 and memory unit 203 are generically used here to refer to any suitable combination of programmable data processing components and data storage that conduct the operations needed to implement the various functions and operations of the acoustic environment server 101. The processor 203 may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 203 may refer to microelectronic, non-volatile random access memory. An operating system may be stored in the memory unit 203, along with application programs specific to the various functions of the acoustic environment server 101, which are to be run or executed by the processor 201 to perform the various functions of the acoustic environment server 101. For example, the acoustic environment server 101 may include an acoustic environment data manager 205. Although described as a software component stored in the memory unit 203 and executed by the processor 201, in some embodiments the acoustic environment data manager 205 may be implemented/represented by hardware logic structures and/or filters that perform the operations and functions described herein.

In one embodiment, the acoustic environment server 101 may include an acoustic environment database 207. The acoustic environment database 207 may store acoustic environment data received from the audio devices $105_1$-$105_N$. In one embodiment, the acoustic environment data may be stored in the acoustic environment data database 207 along with 1) location data describing the location that the acoustic environment data represents and/or 2) timing data describing the point in time the stored acoustic environment data was measured/calculated. The acoustic environment database 207 may use any system for data management. For example, the acoustic environment database 207 may be a relational, an object oriented, or any other database type. Although shown as separate from the memory unit 203, in some embodiments the acoustic environment database 207 may be stored within the memory unit 203.

In one embodiment, the acoustic environment server 101 may also include a network interface 209. The network interface 209 facilitates the transfer of data (e.g., acoustic environment data) between the acoustic environment server 101 and the audio devices $105_1$-$105_N$ using the data network 103. The network interface 209 may operate using one or more network standards and/or protocols. For example, the network interface 209 may operate using any combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Similar to the network interface 209, the network 103 may operate using any combination of wired and wireless protocols and standards, including the IEEE 802.11 suite of standards, IEEE 802.3, cellular GSM standards, cellular CDMA standards, LTE standards, and/or Bluetooth standards. In one embodiment, the network 103 may include one or more network devices that may connect the audio devices $105_1$-$105_N$ to the acoustic environment server 101. For example, the network 103 may include one or more access points, network controllers, hubs, switches, routers, and similar devices for establishing wired and/or wireless network connections between the audio devices $105_1$-$105_N$ and the acoustic environment server 101.

Figure 3:
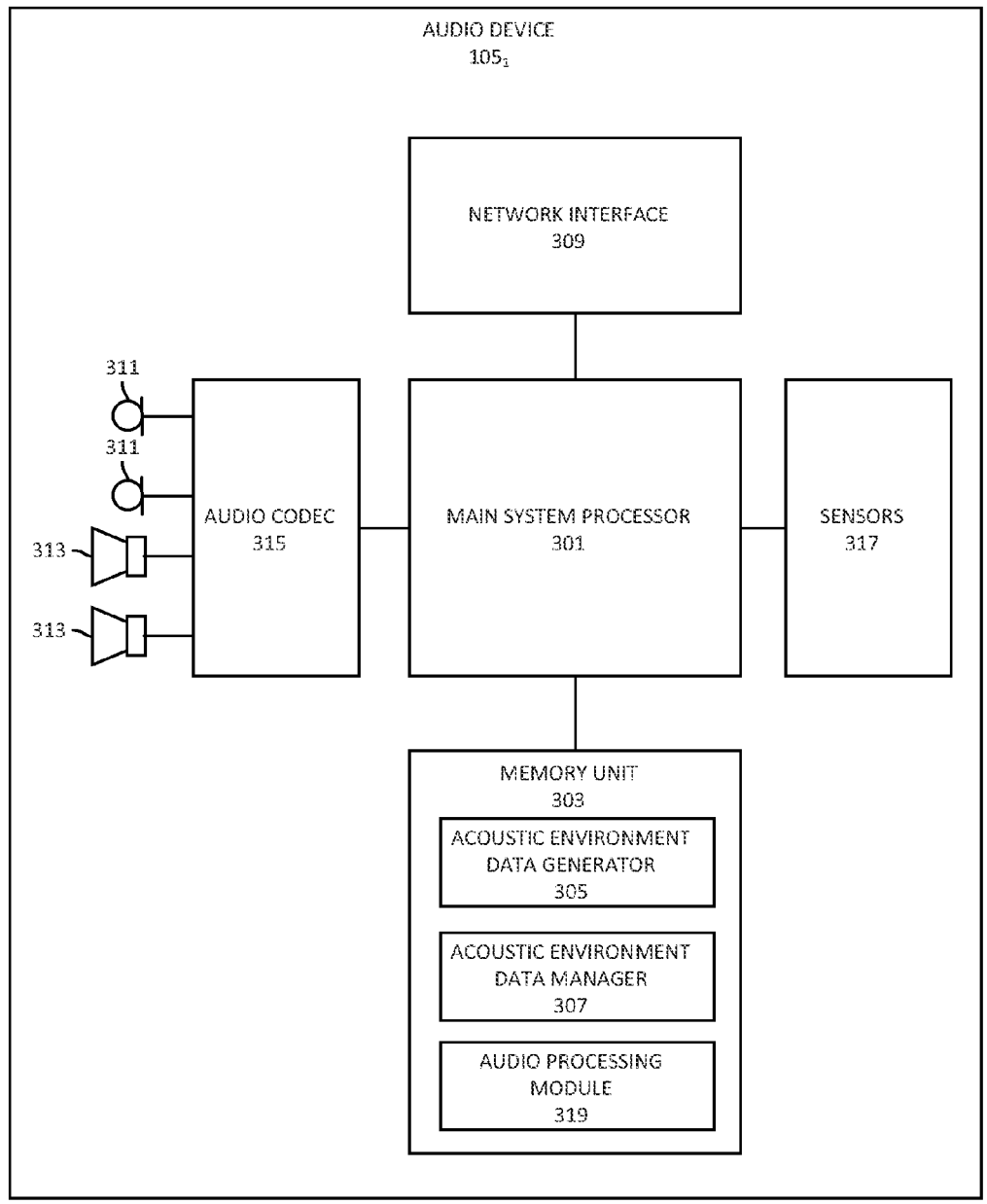
FIG. 3 shows a component diagram for an audio device according to one embodiment.

Turning now to the audio devices $105_1$-$105_N$, FIG. 3 shows a component diagram for the audio device $105_1$ according to one embodiment. In some embodiments, the other audio devices $105_2$-$105_N$ may be configured in a similar fashion as the audio device $105_1$ shown in FIG. 3 and described below.

As shown in FIG. 3, the audio device $105_1$ may include a main system processor 301 and a memory unit 303. Similar to the processor 201 and the memory unit 203, the processor 301 and memory unit 303 are generically used here to refer to any suitable combination of programmable data processing components and data storage that conduct the operations needed to implement the various functions and operations of the audio device $105_1$. The processor 303 may be a special purpose processor such as an ASIC, a general purpose microprocessor, a FPGA, a digital signal controller, or a set of hardware logic structures (e.g., filters, arithmetic logic units, and dedicated state machines) while the memory unit 303 may refer to microelectronic, non-volatile random access memory. An operating system may be stored in the memory unit 303, along with application programs specific to the various functions of the audio device $105_1$, which are to be run or executed by the processor 301 to perform the various functions of the audio device $105_1$. For example, the audio device $105_1$ may include an acoustic environment data generator 305 and an acoustic environment data manager 307. Although described as software components stored in the memory unit 303 and executed by the processor 301, in some embodiments the acoustic environment data generator 305 and the acoustic environment data manager 307 may be implemented/represented by hardware logic structures and/or filters that perform the operations and functions described herein.

In one embodiment, the audio device $105_1$ may also include a network interface 309. The network interface 309 facilitates the transfer of data (e.g., acoustic environment data) with the acoustic environment server 101 using the data network 103. Similar to the network interface 209 of the acoustic environment server 101, the network interface 309 may operate using one or more network standards and/or protocols. For example, the network interface 309 may operate using any combination of wired and wireless protocols and standards, including the IEEE 802.11 suite of standards, IEEE 802.3, cellular GSM standards, cellular CDMA standards, LTE standards, and/or Bluetooth standards.

In one embodiment, the audio device $105_1$ may include a set of microphones 311. The microphones 311 may sense sounds proximate to the audio device $105_1$ and convert these sensed sounds into electrical signals. The microphones 311 may be any type of acoustic-to-electric transducer or sensor, including a Micro Electrical-Mechanical System (MEMS) microphone, a piezoelectric microphone, an electret condenser microphone, or a dynamic microphone. The microphones 311 may utilize various weights and delays to provide a range of beam/polar patterns, such as cardioid, omnidirectional, and figure-eight patterns.

In some embodiment, the audio device $105_1$ may include a set of loudspeakers 313. The loudspeakers 313 may be used for outputting audio processed by the audio device $105_1$ using acoustic environment data. The loudspeakers 313 may receive audio signals/content from a remote system via the network interface 309 or may retrieve audio signals/content from a local storage (e.g., the memory unit 303). In one embodiment, each of the loudspeakers 313 may include a single transducer, while in other embodiments each of the loudspeakers 313 may be loudspeaker arrays that include multiple transducers housed in a single cabinet.

The transducers may be any combination of full-range drivers, mid-range drivers, subwoofers, woofers, and tweeters. Each of the transducers may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' magnetic system interact, generating a mechanical force that causes the coil (and thus, the attached cone) to move back and forth, thereby reproducing sound under the control of the applied electrical audio signal.

Each transducer may be individually and separately driven to produce sound in response to separate and discrete audio signals. By allowing the transducers in the loudspeakers 313 to be individually and separately driven according to different parameters and settings (including delays and energy levels), the loudspeakers 313 may produce numerous directivity patterns to simulate or better represent respective channels of sound program content played to a user. For example, beam patterns of different widths and directivities may be emitted by the loudspeakers 313.

In one embodiment, the audio device $105_1$ may include an audio codec 315 for managing audio signals received from the microphones 311 and/or the audio signals used to drive the loudspeakers 313. Management of audio signals may include digital-to-analog and analog-to-digital conversions, loudness normalization, and general signal processing. In some embodiments, the audio codec 315 may include circuitry for processing audio signals received from the microphones 311 and/or used to drive the loudspeakers 313. In other embodiments, the circuitry may be separate from the audio codec 315. In some embodiments, an audio processing module 319 may be stored in the memory unit 303 for processing audio signals received from the microphones 311 and/or used to drive the loudspeakers 313. Processing of the audio signals in any of these embodiments may be performed based on acoustic environment data for the current location of the audio device $105_1$ as will be described in greater detail below.

In one embodiment, the audio device $105_1$ may include one or more sensors 317 for determining the location of the audio device $105_1$. For example, the sensors 317 may include a satellite positioning system receiver (e.g., a Global Positioning System (GPS) receiver) for retrieving positioning data describing the location of the audio device $105_1$. In another embodiment, the sensors 317 may include a wireless interface, such as the network interface 309. The wireless interface may detect wireless signals from proximate wireless devices. Based on known transmit signal strengths and received signal strengths, the audio device $105_1$ may be able to determine the distance separating one or more of these wireless devices and the audio device $105_1$. These distance values may thereafter be used to triangulate a position/location of the audio device $105_1$ relative to one or more of the wireless devices.

As noted above, the audio device $105_1$ may be representative of the other audio devices $105_2$-$105_N$ in the system 100. In these embodiments, the audio devices $105_2$-$105_N$ may each include the components described above and shown in FIG. 3 in relation to the audio device $105_1$. In other embodiments, the audio devices $105_2$-$105_N$ may include more or less components than those shown in FIG. 3 and described above in relation to the audio device $105_1$.

Figure 4:
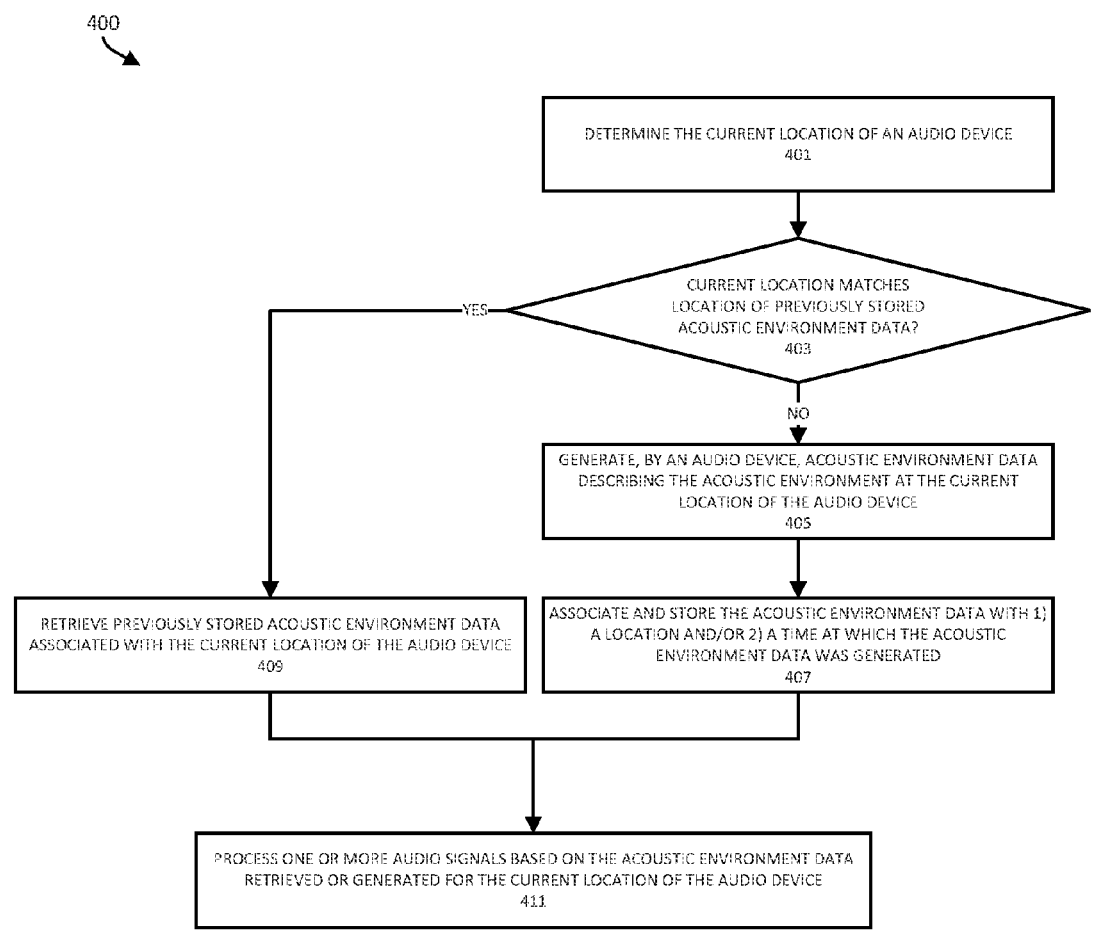
FIG. 4 shows a method for adjusting/processing audio signals/content based on acoustic environment data according to one embodiment.

Turning now to FIG. 4, a method 400 for adjusting/processing audio signals/content based on acoustic environment data will be described. In one embodiment, each operation of the method 400 may be performed by one or more components of the acoustic environment data server 101 and/or the audio device $105_1$.

Although the operations of the method 400 are shown and described in a particular order, in other embodiments the operations may be performed in a different order. For example, one or more of the operations may be performed concurrently or during overlapping time periods. Each operation of the method 400 will be described below by way of example.

Figure 5:
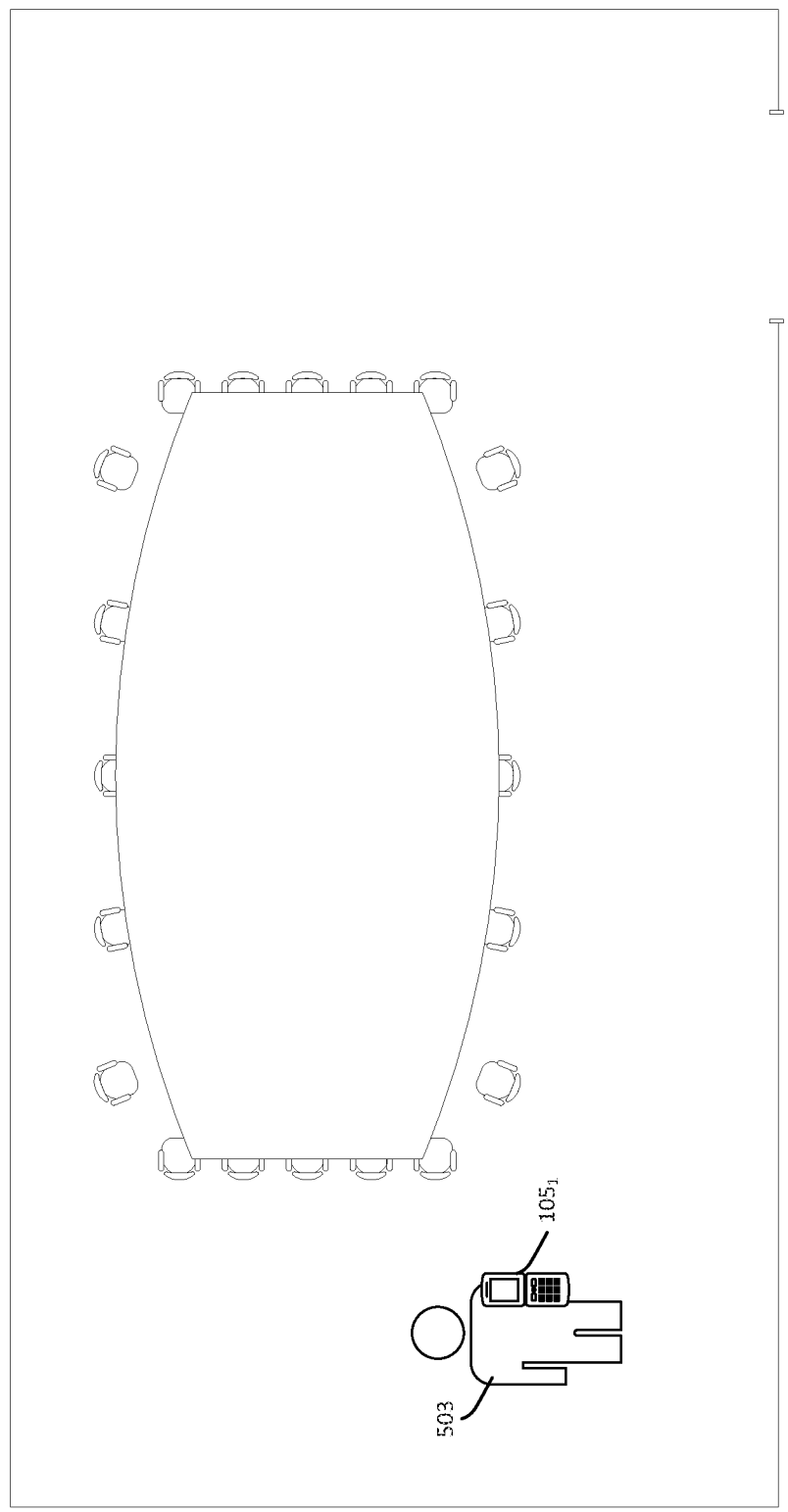
FIG. 5 shows an overhead view of an acoustic environment.

In one embodiment, the method 400 may commence at operation 401 with the determination of the current location of the audio device $105_1$. The current location of the device $105_1$ may be determined using the sensors 317 of the audio device $105_1$. In this embodiment, the sensors 317 may include a satellite positioning system receiver (e.g., a Global Positioning System (GPS) receiver) and/or a wireless network interface. For example, FIG. 5 shows an overhead view of a first location 501 according to one embodiment. In this example, the audio device $105_1$ may be a cellular telephone that is located with a user 503 within the first location 501. As shown, the first location 501 may be a room within a building; however, in other embodiments the first location 501 may be any area, including a theatre, a public area (e.g., a shopping mall), an outdoor environment, or any other type of area. On the basis of the example situation shown in FIG. 5, operation 401 may return location data corresponding to the first location 501. For example, operation 401 may return a set of GPS coordinates corresponding to the first location. In other embodiments, operation 401 may return a room identifier (e.g., "Meeting Room A, Third Floor").

At operation 403, the current location of the audio device $105_1$ determined at operation 401 may be compared against location data corresponding to a set of previously stored pieces of acoustic environment data. As will be described in greater detail below, the previously stored acoustic environment data describes acoustic characteristics of previously visited/analyzed locations of the audio device $105_1$. For example, the previously stored acoustic environment data may describe reverberation/echo level of a location, a noise level at a location, a noise type at a location (e.g., an air conditioner or bar noise), or any other similar characteristic. This previously stored acoustic environment data may be associated with location data during storage such that operation 403 may determine whether previously stored acoustic environment data is available for the current location of the audio device $105_1$ (i.e., whether previously stored acoustic environment data has location data that matches with or is within a predefined threshold distance relative to the current location of the audio device $105_1$).

In some embodiments, the previously stored acoustic environment data may have been generated by the audio device $105_1$. However, in other embodiments, the previously stored acoustic environment data may have been generated by another audio device $105_2$-$105_N$. Accordingly, in some embodiments, the audio device $105_1$ may leverage acoustic environment data calculated/generated by other audio devices $105_2$-$105_N$.

In some embodiments, the previously stored acoustic environment data may be stored locally on the audio device $105_1$ (e.g., in the memory unit 303). In these embodiments, the comparison at operation 403 may be performed by querying this local data repository using the acoustic environment data manager 205. In other embodiments, the previously stored acoustic environment data may be stored remotely. For example, the previously stored acoustic environment data may be stored on the acoustic environment server 101. In these embodiments, operation 403 may be performed using the acoustic environment data managers 205 and 307 by transmitting a query to the acoustic environment server 101 via the network 103.

In some embodiments, although a match between a current location of the audio device $105_1$ and location data for previously stored acoustic environment data is made, operation 403 may determine that this acoustic environment data is old/outdated. For example, the previously stored acoustic environment data may be associated with a time of creation/generation/storage. In this example, operation 403 may determine that the age of the previously stored acoustic environment data is above a threshold value (e.g., current_time−creation_time_acoustic_env_data>threshold value). Accordingly, the method 400 may attempt to ignore previously stored acoustic environment data that is old/outdated as the acoustic environment that this data represents may have changed since the acoustic environment data was generated/calculated (e.g., addition of more furniture, addition of carpet to replace hardwood floors, etc.). In one embodiment, the threshold value may be between 7-30 days.

Upon determining at operation 403 that acoustic environment data corresponding to the current location of the audio device $105_1$ was not previously stored or is old/outdated, operation 405 may generate acoustic environment data for the current location of the audio device $105_1$. For instance, in the example shown in FIG. 5, the first location 501 may include a number of characteristics that define the acoustic properties of this environment. As briefly described above, the characteristics may include the reverberation/echo level of the first location 501, a noise level at the first location 501, a noise type at the first location 501 (e.g., an air conditioner or bar noise), or any other similar characteristic.

For example, in one embodiment, operation 405 may calculate the reverberation time $T_{60}$ of the current location of the audio device $105_1$ using the acoustic environment data generator 305. The reverberation time $T_{60}$ may be estimated by acoustical measurements using the microphones 311 and/or the speakers 313. The reverberation time $T_{60}$ is defined as the time required for the level of sound to drop by 60 dB in the subject location. The reverberation time $T_{60}$ does not need to be measured at a particular point within the location or with any particular beam pattern. The reverberation time $T_{60}$ is a property of the location being analyzed and is a function of frequency.

The reverberation time $T_{60}$ may be measured using various processes and techniques. In one embodiment, an interrupted noise technique may be used to measure the reverberation time $T_{60}$. In this technique, wide band noise is played and stopped abruptly. With the microphones 311 and an amplifier connected to a set of constant percentage bandwidth filters such as octave band filters, followed by a set of ac-to-dc converters, which may be average or rms detectors, the decay time from the initial level down to −60 dB is measured. It may be difficult to achieve a full 60 dB of decay, and in some embodiments extrapolation from 20 dB or 30 dB of decay may be used. In one embodiment, the measurement may begin after the first 5 dB of decay.

In one embodiment, a transfer function measurement may be used to measure the reverberation time $T_{60}$. In this technique, a stimulus-response system in which a test signal, such as a linear or log sine chirp, a maximum length stimulus signal, or other noise-like signal, is measured simultaneously in what is being sent and what is being measured with the microphones 311. The quotient of these two signals is the transfer function. In one embodiment, this transfer function may be made a function of frequency and time and thus is able to make high resolution measurements. The reverberation time $T_{60}$ may be derived from the transfer function. Accuracy may be improved by repeating the measurement sequentially from each of multiple loudspeakers' 313 and each of multiple microphones' 311 positions in the location being analyzed (i.e., the current location of the audio device $105_1$).

Accordingly, the reverberation time $T_{60}$ may be calculated/generated at operation 405 using a variety of techniques. Other characteristics of the current location of the audio device $105_1$ may also be calculated/generated at operation 405. For example, the microphones 311 may detect a noise level or signal-to-noise ratio (SNR) within the location of the audio device $105_1$. In particular, a sound level may be calculated based on outputs from the microphones 311. This sound level may be compared against levels of audio played through the loudspeakers 313 to determine a noise level present in the location. In one embodiment, this noise may be classified by type. For example, the noise at the location of the audio device $105_1$ may be classified as either external noises (i.e., noises that are external to the audio device $105_1$) or internal noises (i.e., noises apart from the intended audio that is generated by the audio device $105_1$). These categories of noise may be further sub-classified. For instance, external noises may be sub-classified as mechanical noises (e.g., noise generated by an air conditioner) or human made noises (e.g., noise produced by a set of people at the location of the audio device $105_1$).

Following generation of one or more pieces of data describing the acoustic properties/characteristics of the current location of the audio device $105_1$, operation 407 may associate and store these pieces of acoustic environment data with 1) the current location of the audio device $105_1$ and/or 2) a current time. As noted above, the current location of the audio device $105_1$ may be retrieved at operation 401 and represents the location at which the acoustic environment data was generated at operation 405. Similarly, the current time may indicate the point in time the acoustic environment data was generated at operation 405.

In one embodiment, the acoustic environment data may be associated with 1) a location of the audio device $105_1$ when the acoustic environment data was generated and/or 2) a time the acoustic environment data was generated/calculated by adding the location and time data to metadata of the acoustic environment data. For example, the location and/or time data may be added to a header of a data structure representing the acoustic environment data generated/calculated at operation 405.

Although described as the acoustic environment data generator 305 being located within the audio device $105_1$ such that the audio device $105_1$ generates acoustic environment data, in other embodiments the acoustic environment data generator 305 may be located within the acoustic environment sever 101. In these embodiments, the audio device $105_1$ may transmit data indicating the current location of the audio device $105_1$ along with one or more microphone signals to the server 101. The server 101 may thereafter generate acoustic environment data based on these received microphone signals. By generating the acoustic environment data at operation 405, the acoustic environment server 101 reduces the amount of resources consumed on the audio device $105_1$ by instead utilizing resources on the acoustic environment server 101 for potentially intensive processing operations.

As described above in relation to operation 403, in one embodiment, the acoustic environment data may be stored locally on the audio device $105_1$. For example, the acoustic environment data may be stored in the memory unit 303 of the audio device $105_1$. In other embodiments, the acoustic environment data may be stored remotely. For example, the acoustic environment data may be transmitted from the audio device $105_1$ to the acoustic environment data server 101 via the network 103. The transmission may include the acoustic environment data along with associated location and/or time data. For instance, the location and time data may be included in metadata of the acoustic environment data or the location and time data may be included in the same transmission unit or stream initiated by the acoustic environment data manager 307 of the audio device $105_1$. The acoustic environment data manager 205 of the acoustic environment server 101 may receive the acoustic environment data and/or location/time data from the audio device $105_1$ and store the received data in the acoustic environment database 207 at operation 407. In some embodiments, the acoustic environment data database 207 may include separate fields in a single entry for each piece of 1) acoustic environment data; 2) location data; and 3) time data. For example, an entry in the acoustic environment data database 207 may include a first field corresponding to a reverberation time $T_{60}$ of the first location 501, a second field corresponding to a noise level of the first location 501, a third field corresponding to location data for the first location 501 (e.g., GPS coordinates), and a fourth field corresponding to the time the reverberation time $T_{60}$ represented by the first field and the noise level represented by the second field were calculated/generated.

Although shown as the database residing on the acoustic environment server 101, in some embodiments in which acoustic environment data is stored locally, the acoustic environment data database 207 may be located on audio device $105_1$. In these embodiments, the acoustic environment data database 207 may be stored within or separate from the memory unit 303.

As described above, upon determining at operation 403 that acoustic environment data for the current location of the audio device $105_1$ has not been previously generated and stored or the previously stored acoustic environment data is old/outdated, acoustic environment data may be generated and stored using operations 405 and 407, respectively. In contrast, upon determining at operation 403 that up-to-date acoustic environment data is available for the current location of the audio device $105_1$, operation 409 may retrieve this acoustic environment data.

As described above, acoustic environment data may be either stored locally on the audio device $105_1$ or remotely (e.g., on the acoustic environment data server 101). When the acoustic environment data is stored locally, operation 409 may retrieve acoustic environment data corresponding to the current location of the audio device $105_1$ by directly accessing the table, database, or other data structure in which previously stored acoustic environment data is located. When the acoustic environment data is remotely stored, operation 409 may transmit a request for acoustic environment data to the remote location (e.g., the acoustic environment server 101).

Following storage of the acoustic environment data corresponding to the current location of the audio device $105_1$ at operation 407 or after retrieval of previously stored acoustic environment data corresponding to the current location of the audio device $105_1$, operation 411 may utilize the generated or retrieved acoustic environment data to process one or more audio signals. In some embodiments, the audio signals may be generated by one or more of the microphones 311 within the audio device $105_1$.

Figure 6:
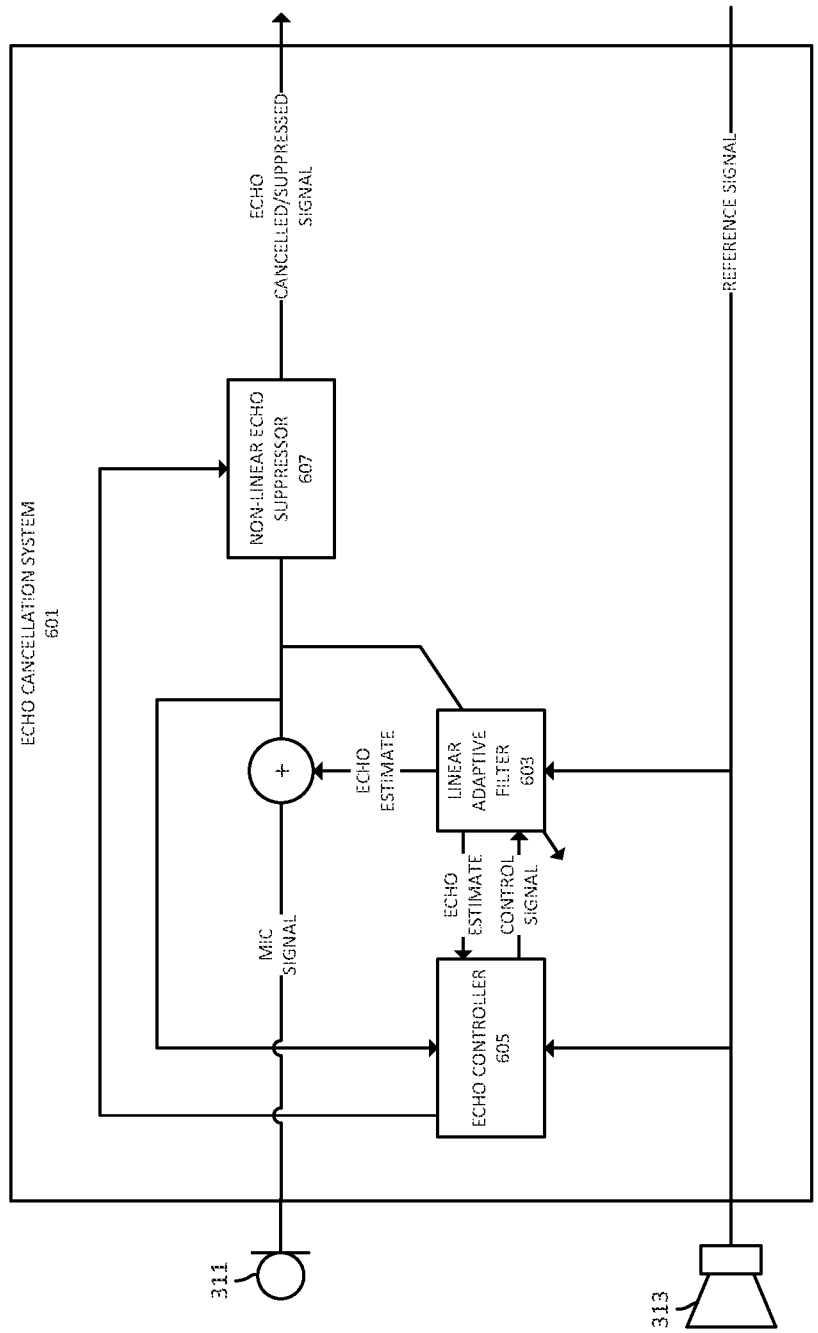
FIG. 6 shows an echo cancellation system according to one embodiment.

For example, as noted above the acoustic environment data may include data that describes the reverberation/echo level of the current location of the audio device $105_1$. This reverberation/echo level may be used to determine the level or type of echo cancellation to be performed on signals generated by the microphones 311 of the audio device $105_1$. For example, FIG. 6 shows an echo cancellation system 601 integrated within the audio device $105_1$. The echo cancellation system 601 may be implemented by the audio codec 315, the audio processing module 319, or other circuitry or processing components within the audio device $105_1$.

As shown, the echo cancellation system 601 may include a linear adaptive filter 603, which attempts to remove linear echo components from a microphone signal generated by the one or more microphones 311 based on a reference signal, which drives the loudspeaker 313. In this embodiment, an echo controller 605 may control the operation of the linear adaptive filter 603 and/or an optional non-linear echo suppressor 607 based on the acoustic environment data generated at operation 405 or retrieved at operation 409. For example, reverberation/echo level information included in the acoustic environment data may indicate the length and the exponential decay rate of the impulse response at the current location of the audio device $105_1$. Based on this information, the echo controller 605 at operation 411 may determine whether the span of the linear adaptive filter 603 is sufficient to cancel echo in the processed microphone signal. When the linear adaptive filter 603 is not sufficient (i.e., the span of the linear adaptive filter 603 is not large enough), the echo controller 605 may activate a non-linear echo suppressor 607. The non-linear echo suppressor 607 may thereafter be used to suppress echo in the microphone signal that may not be addressed by the linear adaptive filter 603.

In other embodiments, reverberation level indicated by the acoustic environment data generated at operation 405 or retrieved at operation 409 may be used for selectively/adaptively processing voice commands received through the microphones 311. For example, based on the retrieved/ generated acoustic environment data, when the current location of the audio device $105_1$ has a high amount of reverberation/echo, operation 411 may aggressively attempt to remove reverberation/echo in a microphone signal. In contrast, when the current location of the audio device $105_1$ has a low amount of reverberation/echo, operation 411 may not attempt to remove reverberation/echo such that the microphone signal is not distorted by the potential removal of non-echo components.

In still other embodiments, the audio processing module 319 of the audio device $105_1$ may include noise reduction modules/circuitry. In these embodiments, a noise type and a noise level may be utilized to calibrate the noise reduction modules/circuitry for optimal performance. Similarly, the audio processing module 319 of the audio device $105_1$ may include automatic speech recognition modules/circuitry. In these embodiments, a noise type, a noise level, and a reverberation level may be utilized to calibrate the automatic speech recognition modules/circuitry for optimal performance. As described above, the method 400 attempts to utilize previously stored acoustic environment data when processing audio signals. In particular, when acoustic environment data is available for the current location of the audio device $105_1$ and is not old/outdated, this data may be used for processing audio signals. Accordingly, the method 400 may avoid the increased overhead in generating/calculating acoustic environment data for the current location of the audio device $105_1$ when this data has already been generated and is likely accurate. In particular, the time and complexity involved in determining reverberation/echo levels, noise levels, and noise types may be avoided when this information is available in storage. As noted above, this previously stored acoustic environment data may not be limited to data generated/calculated by the same audio device $105_1$-$105_N$. Instead, by using a centralized repository (e.g., the acoustic environment server 101), audio devices $105_1$-$105_N$ may leverage previously generated/calculated data values by other devices $105_1$-$105_N$.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for processing an audio signal, comprising:
    determining a current location of an audio device;
    querying a set of acoustic environment data using the determined current location of the audio device, wherein each piece of acoustic environment data in the set of acoustic environment data describes acoustic characteristics of a location and is associated with location data describing a location that the piece of acoustic environment data represents;
    in response to locating a match between the current location of the audio device and location data associated with a queried piece of acoustic environment data in the set of acoustic environment data, determining whether an age of the queried piece of acoustic environment data is greater than a threshold value; and
    when the age of the queried piece of acoustic environment data is determined to be greater than the threshold value, generating a new piece of acoustic environment data and processing the audio signal using the generated new piece of acoustic environment data, and when the age of the queried piece of acoustic environment data is determined to be less than the threshold value, retrieving the queried piece of acoustic environment and processing the audio signal using the retrieved piece of acoustic environmental data.

2. The method of claim 1, wherein the piece of acoustic environment data comprises one or more of a reverberation level of the location, a noise level at the location, and a noise type at the location.

3. The method of claim 1, further comprising:
    generating, in response to failing to locate a match between the current location of the audio device and location data associated with a piece of acoustic environment data in the set of acoustic environment data based on the query, a further new piece of acoustic environment data for the current location of the audio device; and
    storing the generated further new piece of acoustic environment data along with the current location of the audio device.

4. The method of claim 3, further comprising:
    processing the audio signal using the generated further new piece of acoustic environment data.

5. The method of claim 3, wherein generating the further new piece of acoustic environment data for the current location of the audio device comprises:
    generating a set of raw microphone signals by a set of microphones integrated within the audio device;
    transmitting the set of raw microphone signals along with the determined current location of the audio device to a device external to the audio device; and
    generating, by the external device, the further new piece of acoustic environment data for the current location of the audio device based on the raw microphone signals received from the audio device.

6. The method of claim 1, wherein one or more pieces of acoustic environment data in the set of acoustic environment data were previously generated by devices separate and distinct from the audio device.

7. The method of claim 1, wherein the set of acoustic environment data is stored on a device external to the audio device.

8. The method of claim 2, wherein processing the audio signal comprises adapting an echo cancellation system using the reverberation level at the location of the audio device.

9. The method of claim 8, wherein adapting the echo cancellation system comprises activating a non-linear echo suppression unit in response to determining that a span of a linear echo canceller is smaller than a length of an impulse response of the location of the audio device described by the reverberation level.

10. An audio device for processing an audio signal, comprising:
- a sensor to determine a current location of the audio device;
- an acoustic environment data manager to 1) query a set of acoustic environment data using the determined current location of the audio device, wherein each piece of acoustic environment data in the set of acoustic environment data describes acoustic characteristics of a location and is associated with location data describing a location that the piece of acoustic environment data represents, 2) in response to locating a match between the current location of the audio device and location data associated with a queried piece of acoustic environment data in the set of acoustic environment data, determine whether an age of the queried piece of acoustic environment data is greater than a threshold value, and 3) when the age of the queried piece of acoustic environment data is determined to be less than the threshold value, retrieve the queried piece of acoustic environment data;
- an acoustic environment data generator to generate a new piece of acoustic environment data when the age of the queried piece of acoustic environment data is determined to be greater than the threshold value; and
- a set of circuitry to process the audio signal using a) the retrieved piece of acoustic environment data when the queried piece of acoustic environment data is less than the threshold value or b) the generated new piece of acoustic environment data when the age of the queried piece of acoustic environment data is greater than the threshold value.

11. The audio device of claim 10, wherein the piece of acoustic environment data includes one or more of a reverberation level of the location, a noise level at the location, and a noise type at the location.

12. The audio device of claim 11, wherein the set of circuitry includes:
- circuitry for noise reduction, wherein the noise type and the noise level at the location are used to calibrate the circuitry for noise reduction.

13. The audio device of claim 11, wherein the set of circuitry includes:
- circuitry for automatic speech recognition, wherein the noise type, the noise level, and the reverberation level of the location are used to calibrate the circuitry for automatic speech recognition.

14. The audio device of claim 10, further comprising:
- a set of microphones to detect sound at the current location of the audio device; and
- wherein the acoustic environment data generator is to, in response to failing to locate a match between the current location of the audio device and location data associated with a piece of acoustic environment data in the set of acoustic environment data based on the query, generate a further new piece of acoustic environment data for the current location of the audio device using the set of microphones,
- wherein the acoustic environment data manager is to store the generated further new piece of acoustic environment data along with the current location of the audio device.

15. The audio device of claim 14, wherein the set of circuitry is to process the audio signal using the generated further new piece of acoustic environment data.

16. The audio device of claim 10, wherein one or more pieces of acoustic environment data in the set of acoustic environment data were previously generated by devices separate and distinct from the audio device.

17. The audio device of claim 10, wherein the set of acoustic environment data is stored on a device external to the audio device.

18. The audio device of claim 11, wherein the set of circuitry includes:
- a linear echo canceller;
- a non-linear echo suppressor; and
- an echo controller, wherein the echo controller activates the non-linear echo suppressor in response to determining that a span of the linear echo canceller is smaller than a length of an impulse response of the location of the audio device described by the reverberation level.

19. An article of manufacture, comprising:
- a non-transitory machine-readable storage medium that stores instructions which, when executed by a processor in a computing device,
    - determine a current location of an audio device;
    - query a set of acoustic environment data using the determined current location of the audio device, wherein each piece of acoustic environment data in the set of acoustic environment data describes acoustic characteristics of a location and is associated with location data describing a location that the piece of acoustic environment data represents;
    - in response to locating a match between the current location of the audio device and location data associated with a queried piece of acoustic environment data in the set of acoustic environment data, determine whether an age of the queried piece of acoustic environment data is greater than a threshold value; and when the age of the queried piece of acoustic environment data is greater than the threshold value, generate a new piece of acoustic environment data and process an audio signal using the generated new piece of acoustic environment data, and when the age of the queried piece of acoustic environment data is less than the threshold value, retrieve the queried piece of acoustic environment data and process the audio signal using the retrieved piece of acoustic environment data.

20. The article of manufacture of claim 19, wherein the piece of acoustic environment data includes one or more of a reverberation level of the location, a noise level at the location, and a noise type at the location.

21. The article of manufacture of claim 19, wherein the non-transitory machine-readable storage medium includes further instructions that when executed by the processor:
- generate, in response to failing to locate a match between the current location of the audio device and location data associated with a piece of acoustic environment data in the set of acoustic environment data based on the query, a further new piece of acoustic environment data for the current location of the audio device; and
- store the generated further new piece of acoustic environment data along with the current location of the audio device.

22. The article of manufacture of claim 21, wherein the non-transitory machine-readable storage medium includes further instructions that when executed by the processor:
- process the audio signal using the generated further new piece of acoustic environment data.

23. The article of manufacture of claim 19, wherein one or more pieces of acoustic environment data in the set of acoustic environment data were previously generated by devices separate and distinct from the audio device.

* * * * *